June 29, 1965   C. HORBERG, JR   3,192,349
LINEAR ELECTRICAL SWITCHING CONTROL UNIT
Filed Dec. 6, 1961   2 Sheets-Sheet 1
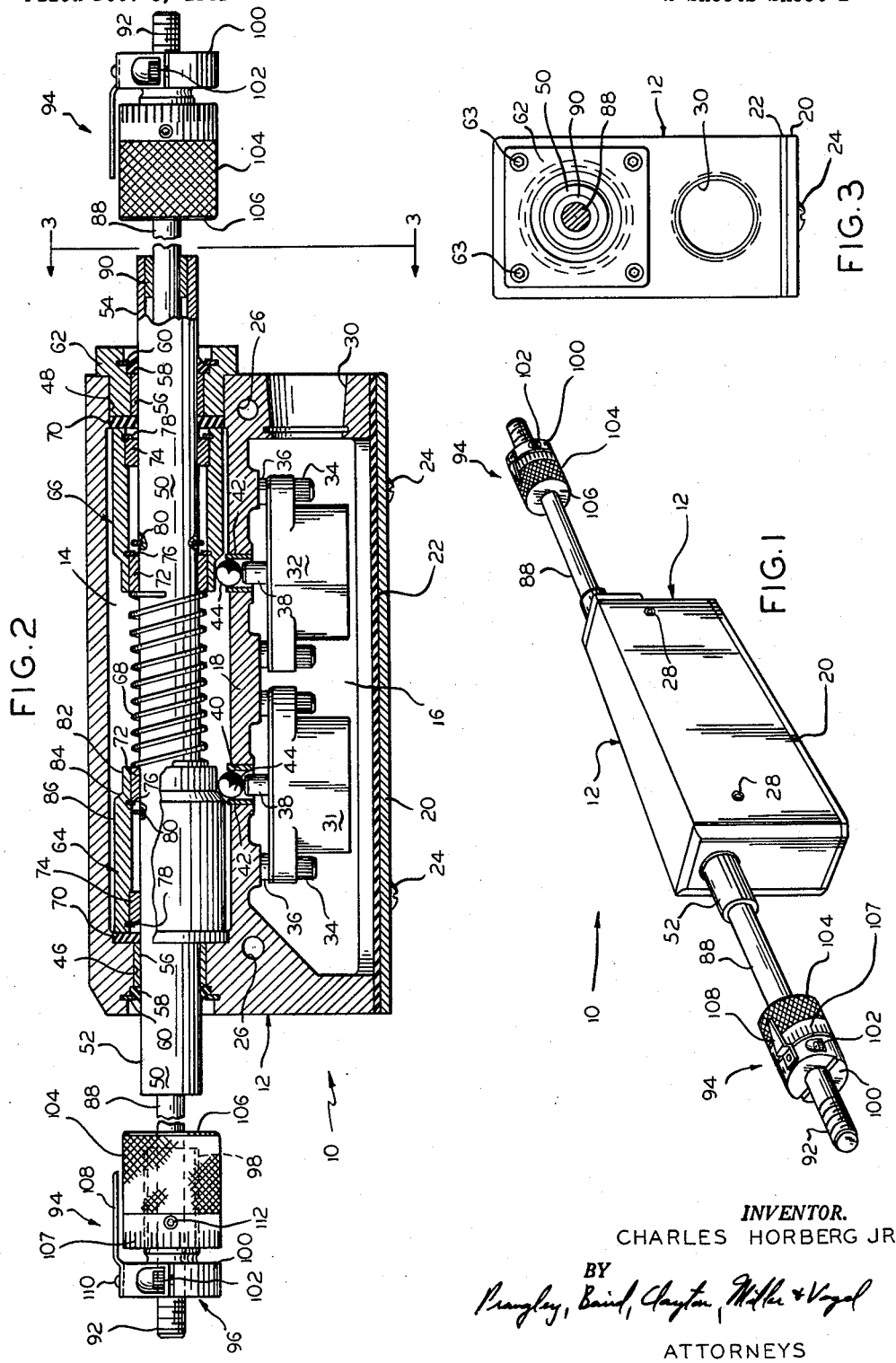
INVENTOR.
CHARLES HORBERG JR.
BY
ATTORNEYS

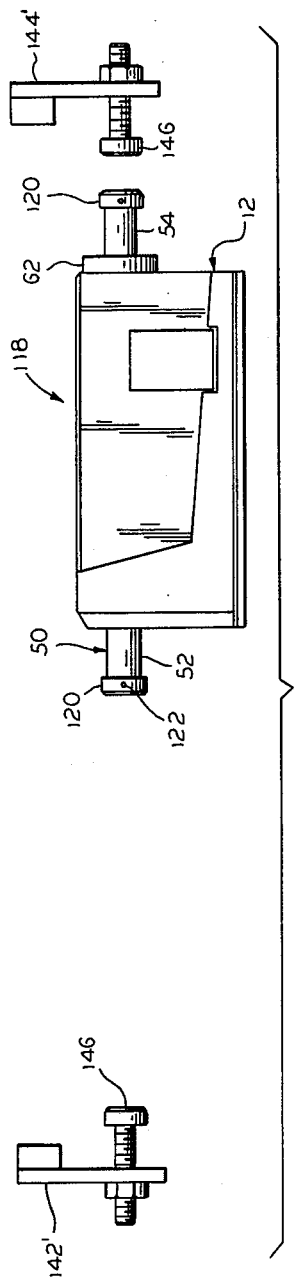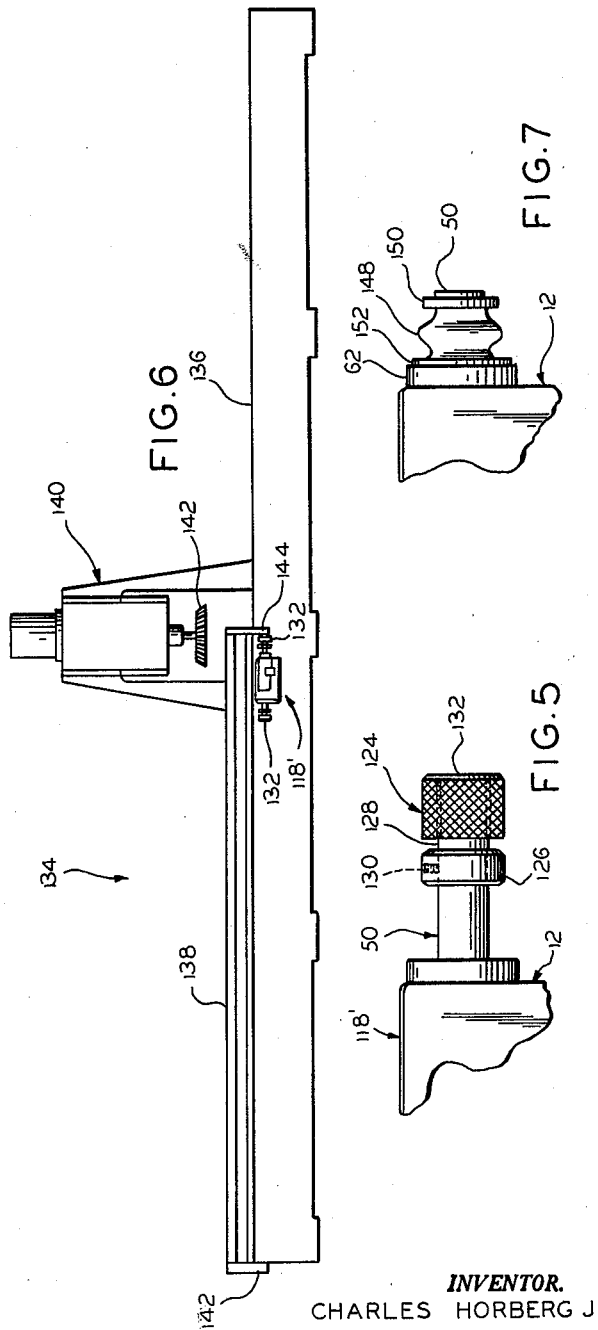

United States Patent Office 3,192,349
Patented June 29, 1965

3,192,349
LINEAR ELECTRICAL SWITCHING CONTROL UNIT
Charles Horberg, Jr., Chicago, Ill., assignor to Paramount Textile Machinery Co., Kankakee, Ill., a corporation of Illinois
Filed Dec. 6, 1961, Ser. No. 157,521
10 Claims. (Cl. 200—153)

This invention relates to a linear control unit adapted for the electrical control of mechanisms in response to movement or travel of parts thereof or of other mechanisms, and particularly, to a universal stroke control unit.

In my U.S. Patent No. 2,968,710, I have disclosed a new linear control unit which is very useful for controlling machines constructed of electrically controlled mechanisms. The control unit is employed with a single reciprocating machine member to control the member or other machine mechanisms. In practice, the unit disclosed in the patent is provided in several sizes to accommodate different stroke lengths of the reciprocating machine member.

An important object of the present invention is to provide a linear control unit which accommodates all stroke lengths. A specific object is to provide a construction in which a switch actuating mechanism is the same for all stroke lengths.

Another object is to provide a linear control unit embodying a connector for adapting the unit to different stroke lengths. The unit is also constructed for use without a connector, as the occasion warrants.

An additional object is to provide a unit which is adjustable to accommodate different stroke lengths.

Another important object is to provide a very compact linear control unit.

Another specific object is to provide a linear control unit embodying relatively movable means for actuating limit switches or the like contained in the unit, whereby the size of the unit is minimized.

A further important object is to provide a linear control unit wherein electrical components are isolated from mechanical components, thus providing a safe, reliable unit, and a unit which may be maintained and repaired by mechanics or electricians as required, without need for both.

Additional objects include the provision of a strong, durable, adaptable, yet compact construction of a small number of parts which may be produced in quantity at low cost and with minimum material requirements, which is easily and rapidly assembled, and which requires extremely little maintenance or repair.

These and other objects, advantages and functions of the invention will be apparent on reference to the specification and to the attached drawings illustrating preferred embodiments of the invention, in which like parts are identified by like reference symbols in each of the views, and in which:

FIGURE 1 is a perspective view of one embodiment of the linear control unit, embodying a connector;

FIG. 2 is an enlarged longitudinal sectional and elevational view thereof;

FIG. 3 is an end elevational view taken on line 3—3 of FIGURE 2;

FIG. 4 is a side elevational view of a second embodiment of the linear control unit, which does not include a connector, illustrating its operation by machine-mounted stops;

FIG. 5 is a side elevational view of an adjustable actuator end construction on the unit of FIG. 4;

FIG. 6 is a side elevational view on a reduced scale illustrating the use of the unit of FIG. 5 in a grinding machine; and FIG. 7 is a side elevational view of a sealed end construction useful with the several preceding embodiments.

The linear control unit of the invention includes a hollow casing, control switch means within the casing, an actuator linearly movable in the casing, and means in the casing for actuating the switch means in response to movement of the actuator. In a preferred embodiment a connector is mounted for linear movement in the same direction as the actuator, the connector being movable relative to the actuator and also movable therewith. The actuator and the connector are interengageable to actuate the switch means in response to movement of the connector. In an alternative embodiment, the unit is employed without the connector, and the actuator is engaged directly by moving machine parts.

Referring to the drawings, a preferred construction of the linear control unit is generally indicated by the number 10 in FIGS. 1-3. It includes a hollow elongated right rectangular casing or housing 12 having a mechanical or actuator compartment 14 and an electrical or switch compartment 16 adjacent thereto (see FIG. 2). The compartments are separated by a dividing or partition wall 18 which extends across the cavity in the casing to completely separate the compartments; in particular, to prevent any foreign materials, parts or implements from entering either compartment from the other. Employing the new construction, the parts are isolated for safety and reliability in use and in working on the units, and mechanics and electricians may work separately on the respective assemblies with which they are concerned.

The casing 12 is constructed preferably as a one-piece cast and machined aluminum body. One side of the casing is open to provide a separate access opening to the electrical compartment 16, which opening is closed by a cover plate 20 and interposed gasket 22 of neoprene or the like, secured to the casing body by screws 24. Two mounting holes 26 extend transversely through the casing 12 adjacent opposite ends thereof for mounting the unit in an appropriate location by screws 28 (FIG. 1) inserted through the holes and into engagement with securing means, not illustrated. An electrical outlet opening 30 is provided in an end wall of the casing and communicates with the electrical compartment 16 for connecting an electrical conduit to the unit. Additional outlet openings may be provided in other locations for increased convenience, in which case the unused openings are plugged.

Two limit switches 31 and 32 or the like are mounted in the electrical compartment 16 on the dividing wall 18 by means of screws 34, with spacers 36 interposed between the switches and the wall. The switches include movable operating members in the form of cylindrical push buttons or pins 38 which extend outwardly therefrom and are resiliently urged by conventional means in the switches, not shown, in the direction of the mechanical compartment 14. Two registering circular passages or openings 40 are provided in the dividing wall 18, and the switch buttons extend into the passages. A tubular bearing sleeve 42 is provided in each passage around the switch button, and a spherical cam follower or ball 44 is received in sealing engagement therein, in contact with the switch button 38. By this construction, sealing means are provided between the mechanical and electrical compartments 14 and 16, and the parts in the respective compartments are operatively associated with each other through the sealing means.

The opposite end walls of the casing 12 are provided with respective longitudinal bores 46 and 48, which extend from the exterior of the casing to the interior of the mechanical compartment 14. A cylindrical actuator tube 50 is received in the bores, and its opposite ends 52 and 54 protrude or extend longitudinaly from the opposite ends of the casing. The actuator is axially reciprocally movable in the casing. It is mounted in a bearing 56 in one end bore 46, and a wiper ring 58 is secured around the actuator adjacent to the bearing by a snap ring 60 mounted on the wall of the bore. The opposite end bore 48 is enlarged to provide an access opening, and a tubular journal plug or cap 62 is inserted in the bore around the actuator 50. A bearing 56, a wiper ring 58, and a snap ring 60 are mounted in the journal plug 62, around the actuator in like manner to the parts bearing the same numbers in the opposite end bore 46. The journal plug is secured in place by screws 63 (FIG. 3) which threadedly engage the casing 12.

Two circular tubular cams 64 and 66 are mounted on the actuator 50 within the mechanical compartment 14, normally at opposite ends of the compartment. The cams are rotatably and axially movable relative to the actuator. A coil compression cam spring 68 is mounted on the actuator 50 therearound, between the cams 64 and 66, and bearing against their respective inner ends for urging them apart. The opposite ends of the cams normally bear on elastomeric cushion or bumper rings 70 mounted in the ends of the mechanical compartment.

Two longitudinally spaced bearings 72 and 74 are interposed between each of the cams 64 and 66 and the actuator 50, adjacent the opposite ends of the cams. The bearings are held in place by snap rings 76 and 78 which are mounted on the inner wall of each cam 64 and 66. A snap ring 80 is mounted on the actuator 50 between the snap rings 76 and 78 for each cam.

The inner snap ring 76 of each cam and the snap ring 80 adjacent thereto on the actuator provide means selectively interengaging the actuator and the cams. Thus, during the travel of the actuator 50 in one direction of reciprocal movement, e.g., from right to left in FIG. 2, the actuator engages the right-hand cam 66 by means of the snap rings 76 and 80, and moves the cam to the left. The like cam and actuator snap rings 76 and 80 within the left-hand cam 64 move apart; and the actuator moves relative to the latter cam, which stays in its normal or starting position abutting a cushion ring 70. When the actutator 50 moves in the reverse direction, from left to right, the right-hand cam 66 is returned to is normal position by the cam spring 68. The rings 76 and 80 within the left-hand cam 64 are moved into engagement and cause the cam to be moved to the right, while the other cam 66 is disengaged and remains in is normal position. In this manner, as the actuator 50 is reciprocated, the cams are alternately engaged, while the cam not engaged is in its normal position adjacent the end of the compartment. The construction results in a very compact unit, since no room for movement of the cam not engaged need be provided in the mechanical compartment 14.

Each of the cams 64 and 66 includes an inner cylindrical shoulder 82, an intermediate outwardly widening conical cam surface 84, and an outer enlarged cylindrical body 86. The cam follower balls 44 normally extend into the mechanical compartment 14 adjacent to the shoulders 82, being maintained in this position by the switch buttons 38. When a cam is moved towards the center of the compartment by the actuator 50 engaged therewith, the cam surface 84 depresses the cam follower ball to the level of the surface of the cam body 86, thus depressing the switch buttton 38 and actuating the limit switch 31 or 32. Thereafter, the cam may be moved a certain additional distance towards the opposite side of the compartment by the actuator 50, to provide for over-travel of the actuator, e.g., for a predetermined distance of ½ inch. During such over-travel, the cam follower ball 44 engages the relatively elongated cam body 86 and remains depressed, and the snap ring 80 enclosed by the remaining cam moves unimpeded between the inner snap ring 76 on the remaining cam and the outer cam bearing 74. The operation of the respective cams 64 and 66 is reversed when the actuator 50 moves in the reverse direction.

A cylindrical connector, coupling member, or connecting rod 88 is mounted coaxially within and protrudes from the opposite ends of the actuator 50. It is axially slidably movable relative thereto on end bearings 90 between the connector and actuator. The connector is provided with threaded opposite protruding ends 92 for coupling to a moving machine part, not shown. The ends of the connector are provided with strikers or stop means 94 adapted to abut on the respective ends 52 and 54 of the actuator 50 which protrude from the casing 12. The strikers preferably are adjustably mounted on the connector for abutting or engaging the actuator during a selected portion of the travel of the connector in each direction of its reciprocal movement.

In the illustrative embodiment, strikers 94 which include both gross and fine adjustment means are mounted on each end of the connector 88. Alternatively, strikers providing only gross adjustment may be employed on either end, as required. The striker 94 includes a tubular barrel 96 which includes an externally threaded shank 98 integral with an enlarged circular split collar 100. The barrel 96 receives the connector 88 therethrough, and the collar 100 is tightened thereon by means of two screws 102 which join the parts of the collar. The barrel is fixed on the connector 88 in this manner in a location which will provide the desired gross adjustment. If only gross adjustment is needed, the shank 98 may be omitted and only a collar such as 100 employed.

The striker 94 also includes an internally threaded striker head 104 having a closed inner face 106 (FIG. 1). The striker head threadedly engages the barrel shank 98, so that the striker face 106 constitutes the inner end of each striker 94. In operation of the unit, a striker face 106 abuts on or engages the corresponding protruding end 52 or 54 of the actuator 50. The striker head 104 provides vernier means for fine adjustment of the striker, including a vernier scale 107. A pointer 108 is mounted on the collar 100 by means of a screw 110, and it cooperates with the vernier scale. The desired fine adjustment is made by turning the striker head 104 on the shank 98, thus moving the head axially with respect to the connector 88, to or from the actuator 50. The striker head is secured in its adjusted position by means of a set screw 112 (FIG. 2) which extends from the head into engagement with the shank 98.

In a preferred manner of use, the control unit 10 is mounted on a flat surface by means of the screws 28 inserted through the transverse openings 26 in the casing 12, with the unit parallel in two planes to the movement of a reciprocally movable machine member or slide to be controlled. One threaded end 92 of the connector 88 is linked to the machine member for axial reciprocal movement therewith by a suitable self-aligning coupling arrangement, e.g., a fork, yoke, clevis, bracket, or the like. The machine member may be coupled to either threaded end 92, and this constitutes a feature of the invention.

The positions of the strikers 94 are next adjusted to provide interengagement of the connector 88 and the actuator 50 at selected locations of the connector relative to the actuator. Two kinds of adjustment may be made: length of stroke, represented by the distance between the inner faces 106 of the respective striker heads; and relative locations of the connector and the actuator for a given stroke length, represented by the positions of the striker faces 106 with respect to the connector ends 92. The latter adjustment provides for longitudinal variations in mounting the casing 12 relative to the moving machine member and the connector linked thereto. Gross adjustment of the connector travel in either direction is made by means of the collar tightening screws 102, with the striker head 104 set at the mid-point of its vernier scale 106. Micrometer adjustments in thousandths of an inch are then made by turning the striker head 104 on the barrel shank 98, followed by tightening the set screw 112.

When the machine being controlled is in operation, the reciprocally moving machine member and the connector rod 88 reciprocate together. The connector rod reciprocates axially in the actuator tube 50, which initially is stationary. When the connector 88 moves to the right in FIG. 2, the face 106 of the left-hand striker head 104 ultimately abuts on the protruding end 52 of the actuator on the left side of the control unit. Thereafter, the connector 88 and the actuator 50 move together to the right. The snap ring 80 on the actuator next engages the ring 76 on the left-hand cam 64 and moves the cam with the actuator, depressing the left cam follower ball 44. The movement of the ball causes the switch button 38 to actuate the switch 31. In the illustrative embodiment, operation of the switch reverses the moving member of the machine being controlled, causing the connector 88 to reverse its direction of movement. As described above, the construction permits of a certain over-travel of the moving machine member following operation of the switch.

As the connector 88 moves to the left in FIG. 2 following the reversal, the left-hand striker head 104 ultimately will clear the left-hand end 52 of the actuator, whereupon the cam spring 68 moves the left-hand cam 64 to the left and to its normal or starting position, permitting the left cam follower ball 44 and the switch button 38 to raise and restore the switch 31. Continued movement of the connector to the left ultimately brings the right-hand striker head face 106 into abutting engagement with the right-hand protruding end 54 of the actuator 50. Further movement of the connector causes the actuator to move therewith and engage the actuator snap ring 80 with the snap ring 76 of the right-hand cam 66. Continued movement causes the cam to depress the right cam follower ball 44 and actuate the second control switch 32. The switch causes the direction of movement of the connector 88 to be reversed a second time. As the right-hand striker head 104 clears the actuator end 54 when the connector 88 once more moves to the right, the cam spring 68 restores the cam 66 to its starting position, and the switch 32 is restored. This completes a cycle of operation, and the cycle is repeated as long as the machine is in operation.

The linear control unit 10 is adaptable to any length of the reciprocating stroke. A single connector 88 may be employed for various stroke lengths, and it is simply necessary to adjust the positions of the strikers 94 on the connector to provide the desired stroke length. The strikers are moved closer to the actuator 50 for shorter strokes, and more distant therefrom for longer strokes. The constuction also enables the connector 88 to be located in different positions relative to the location of the casing 12, thereby providing flexibility in the locations of the casing and the moving machine member. The construction has the further advantage that the user may furnish the connector 88 best suited to his needs, and it is mounted merely by insertion in the bearings 90 within the actuator 50. The invention thus provides a single compact construction for all stroke lengths. The construction and arrangement of the cams 64 and 66 further contribute to the compactness.

At times it may be preferred to dispense with the connector 88, such as where the machine member travel or stroke length is inordinately long. The unit is well adapted for use without the connector and the strikers thereon, in the manner illustrated in FIGS. 4–6. The construction is otherwise like that of the preceding views, and in addition, strikers are secured on the respective ends 52 and 54 of the actuator 50. In the unit 118 of FIG. 4, hard surface strikers 120 are fixed on the actuator ends by set screws 122. In the modified unit 118' of FIG. 5, strikers 124 are mounted on the actuator ends and are adjustable to extend and retract them in the direction of the actuator axis. The adjustable strikers include a collar 126 fixed on the actuator by a set screw 130 and having a threaded shank 128. A hard surface striker head 132 is mounted on the shank in adjustable threaded engagement.

FIG. 6 illustrates the use of the unit 118' of FIG. 5 to control the operation of a conventional grinding machine 134. The machine includes a bed 136, and a work table 138 which moves from one end of the bed to the opposite end. A head 140 is mounted centrally over the bed, and a grinding tool 142 depends therefrom for operating on the work (not shown), which moves with the table.

The machine bed 136 may be on the order of 100 feet long, with the table 138 traveling 50 feet. It would be impractical to use the control unit 10 including a connector 88 of corresponding length. Accordingly, the control unit 118' is mounted on the side of the bed 136, midway between its ends. Abutments or stops 142 and 144 are secured on the movable table 138 at its respective ends. They are arranged to abut on the strikers 132 at the respective ends of the actuator 50. Thus, when the table 138 moves from right to left, to the position of FIG. 6, the right-hand abutment 144 contacts the striker 132 on the right-hand end of the actuator 50. The consequent actuation of the switch 32 (FIG. 2) may, for example, cause the movement of the table to be reversed, or cause the table to stop. Similarly, when the table moves from left to right, the left-hand abutment 142 contacts the striker on the left-hand end of the actuator 50, to actuate the switch 31.

Fine adjustments are made on the timing of the switch operations relative to the travel of the work table 138 by adjusting the positions of the striker heads 132 on the actuator 50. Alternatively, as illustrated in FIG. 4, the fixed strikers 120 may be used with adjustable abutments 142' and 144' mounted on opposite ends of the work table. Threaded bolts 146 provide adjustable abutting surfaces on these abutments.

FIG. 7 illustrates a modification of the control unit which provides a very tight seal between the actuator 50 and the casing 12. A bellows type elastomeric tubular sleeve 148 is secured at its outer end around the actuator by a ring clamp 150. The sleeve is secured at its inner end on the plug 62 by a retaining ring 152, around the opening in the plug leading to the mechanical compartment 14 (see FIG. 2). A second sleeve 148 is mounted in a similar manner, not illustrated, around the bore 46 at the other end of the compartment 14. This type of flexible seal is made possible by the relatively short travel of the actuator 50 in the control unit.

In addition to the advantages enumerated above, the new control unit employs relatively few and simplified parts which are well adapted to quantity production. The unit is readily assembled and disassembled. Employing self-lubricating bearings, the only lubrication needed is a periodic application of oil to the connector 88. The unit operates under oil drip conditions for long periods of time, requiring no cleaning other than occasional wiping of the connector 88. The unit is readily mounted in a convenient location, and the space requirements are very small. The sliding and moving parts are round and not restricted by anti-rotational devices, so that the parts can and will rotate during operation to present new surfaces to the frictional areas, thereby increasing the surface life. The surface life is also increased by the short travel of the actuator 50 in the construction. The parts are readily accessible for inspection or repair, and the mechanical or electrical work may be performed independently of each other.

It will be apparent that various changes and modifications may be made in the construction and arrangement of the parts within the spirit and scope of the invention. It is intended that such changes and modifications be included within the scope of the appended claims.

I claim:

1. A linear control unit which comprises, in combination, a hollow casing, control switch means within said casing and having a member movable to operate the switch means, an actuator independent of said switch means and linearly movable in said casing, plural means associated with said actuator in said casing for moving said movable member in response to movement of said actuator, means selectively interengaging said actuator and said plural means for movement together to move said movable member, said actuator moving relative to one of said plural means while engaging another, a connector mounted for linear movement in the same direction as said actuator and independently thereof, and means interengaging said actuator and said connector at a selected relative location of said connector for movement of said actuator with said connector to thereby operate said switch means.

2. A control unit as defined in claim 1 wherein said plural means comprise two cams movably mounted on said actuator, and resilient means are provided for urging the cams apart.

3. A linear control unit which comprises, in combination, a hollow casing, control switch means within said casing and having a member movable to operate the switch means, an actuator independent of said switch means and linearly reciprocally movable in said casing and having an end protruding from said casing, means associated with said actuator in said casing for moving said movable member in response to movement of said actuator in the respective directions of reciprocal movement, a connecting rod mounted for linear reciprocal movement in the same directions as said actuator and independently thereof and including a component external to said casing, and means interengaging said actuator protruding end and said connecting rod external component at a selected relative location of said rod for movement of said actuator with said rod in the respective directions of reciprocal movement to thereby operate said switch means, said interengaging means including adjustment means for varying said selective relative location of said rod.

4. A control unit as defined in claim 3 wherein said means for moving said movable member comprise two cams movably mounted on said actuator, and means are provided selectively interengaging said actuator and said cams for movement together to operate said switch means, said actuator moving relative to one of said cams while engaging the other during the travel of said actuator in one direction of reciprocal movement, and said actuator moving relative to said other cam while engaging said one cam during the travel of said actuator in the opposite direction of reciprocal movement.

5. A control unit as defined in claim 3 including in said casing a switch compartment for said switch means and an actuator compartment, sealing means separating said compartments, and means for separate access to the respective compartments.

6. A linear control unit which comprises, in combination, a hollow casing, control switch means within said casing and having a member movable to operate the switch means, a tubular actuator independent of said switch means and axially reciprocally movable in said casing and having opposite ends protruding from said casing, whereby a connecting rod may be inserted through said actuator for cooperation therewith, means including two cams movably mounted on said actuator in said casing for moving said movable member in response to movement of said actuator in the respective directions of reciprocal movement, and means selectively interengaging said actuator and said cams for movement together to operate said switch means, said actuator moving relative to one of said cams while engaging the other during the travel of said actuator in one direction of reciprocal movement, and said actuator moving relative to said other cam while engaging said one cam during the travel of said actuator in the opposite direction of reciprocal movement.

7. A control unit as defined in claim 6 including a spring movably mounted on said actuator between said cams for urging the cams apart.

8. A linear control unit which comprises, in combination, a hollow casing, control switch means within said casing and having a member movable to operate the switch means, a tubular actuator independent of said switch means and axially reciprocally movable in said casing and having opposite ends protruding from said casing, means associated with said actuator in said casing for moving said movable member in response to movement of said actuator in the respective directions of reciprocal movement, a connecting rod mounted in said actuator for reciprocal movement paralleling the actuator axis and independently thereof, said connecting rod having opposite ends protruding from said actuator, and means interengaging said actuator protruding ends respectively with said connecting rod protruding ends at respective selected relative locations of said rod for movement of said actuator with said rod in the respective directions of reciprocal movement to thereby operate said switch means.

9. A linear control unit which comprises, in combination, a hollow casing, control switch means within said casing and having a member movable to operate the switch means, an actuator tube extending through said casing with the opposite ends of the tube protruding from opposite ends of the casing, said actuator tube being axially reciprocally movable in said casing, whereby said actuator tube ends are accessible externally of said casing for movement of the tube by external means engaging respective ends, and whereby a reciprocating rod may be inserted through said actuator tube and provided with such external means for moving the tube in response to movement of the rod, and means including means mounted on said actuator tube in said casing for moving said movable member in response to movement of the tube in the respective directions of reciprocal movement to operate said switch means.

10. A linear control unit which comprises, in combination, a hollow casing, control switch means within said casing and having a member movable to operate the switch means, an actuator independent of said switch means and having opposite ends protruding from said casing and being linearly reciprocally movable in said casing in the directions of said ends, plural means associated with said actuator in said casing for moving said movable member in response to movement of said actuator in the respective directions of reciprocal movement, and means selectively interengaging said actuator and said plural means for movement together to actuate said switch means, said actuator moving relative to one of said plural means while engaging another.

References Cited by the Examiner

UNITED STATES PATENTS 1,695,846  12/28  Harding _____ 200—172
2,550,125  8/51   Schueler et al. _____ 200—50
2,658,123  11/53  Von Stoeser _____ 200—153

BERNARD A. GILHEANY, *Primary Examiner.*